United States Patent [19]

Toda et al.

[11] Patent Number: 4,534,624

[45] Date of Patent: Aug. 13, 1985

[54] CONSTRUCTION OF LENS BARREL OPERATED BY ELECTROMAGNETIC INDUCTION

[75] Inventors: Katuhiko Toda; Susumu Sugiura, both of Kanagawa, Japan

[73] Assignee: Canon Kabushiki Kaisha, Tokyo, Japan

[21] Appl. No.: 396,030

[22] Filed: Jul. 7, 1982

[30] Foreign Application Priority Data

Jul. 14, 1981 [JP] Japan .................. 56-109588
Jul. 22, 1981 [JP] Japan .................. 56-114856

[51] Int. Cl.³ .............................................. G02B 7/02
[52] U.S. Cl. ................................. 350/429; 350/255
[58] Field of Search ................... 350/255, 429, 430

[56] References Cited

U.S. PATENT DOCUMENTS 3,917,394 11/1975 Sturdevant .................. 350/255
4,152,060 5/1979 Specht ........................ 350/255

Primary Examiner—John K. Corbin
Assistant Examiner—D. M. Dzierzynski
Attorney, Agent, or Firm—Toren, McGeady, Stanger, Goldberg & Kiel

[57] ABSTRACT

A lens assembly including an adjusting mechanism arranged to render a part or parts of or all of the optical elments, constituting an optical system, movable by an electric motor drive arrangement, the lens barrel is composed of a stator or stators of one or a plurality of linear motors for driving the adjusting mechanism. The movable element of the linear motor corresponding with the stator is formed into a hollow space, in which each of the movable optical elements can be accommodated.

6 Claims, 17 Drawing Figures

CONSTRUCTION OF LENS BARREL OPERATED BY ELECTROMAGNETIC INDUCTION

BACKGROUND OF THE INVENTION

1. Field of the Invention

This invention relates to a photography lens which is adapted for imaging an object to be photographed and is capable of adjusting the magnification of a picture image.

2. Description of the Prior Art:

The conventional lens of this type has been arranged as follows: The image of an object to be photographed is captured by a focusing lens group of the photograph taking lens. Then, within a cylindrical lens barrel, the focusing lens group is moved in the direction of a optical axis of the lens to adjust it to an in-focus position. In the photograph taking lens of this type, a focusing lens group is mounted on the lens barrel which is either fixedly attached to a camera or arranged to be attachable to and detachable from the camera through suitable coupling means such as a bayonet mount. A focusing ring is mounted on the outside of the lens barrel. Between the focusing ring and the lens holder is means for transmitting a rotatory motion and for converting it into a linear motion in the direction of the optical axis of the lens, such as a helicoidal mechanism. With this arrangement provided, a focusing operation is performed by adjusting the movement of the lens holder through an operation to rotate the focusing ring round the optical axis.

Devices called automatic focusing devices have been developed and have recently come to be used for cameras. The automatic focusing devices of the prior art are arranged to adjust the position of a focusing lens group by automatically moving it upon detection of the position of an object to be photographed. These automatic focusing devices include varied types such as the type using the principle of trigonometrical measurement, the contrast type utilizing the contrast of the image of an object formed on an imaging plane (or at a position equivalent to the imaging plane), etc. Most of interchangeable lenses for single-lens reflex cameras are of the contrast type.

There have been proposed single-lens reflex cameras incorporating such automatic focusing devices with interchangeable lenses having such automatic focusing devices disposed within their lens barrels. Typical examples of these single-lens reflex cameras and interchangeable lenses have been disclosed, for example, in pending U.S. patent application Ser. No. 280,549, filed July 6, 1981, U.S. Pat. No. 3,972,056, etc.

In accordance with the arrangement of the prior art, a driving device for driving a lens holder of a lens barrel in response to a signal from an automatic focusing device is comprised of a motor for driving the lens holder in response to an automatic focusing and a gear mechanism for transmitting the rotating force of the motor to the lens holder. However, since the components of the lens barrel are arranged separately from the motor and the gear mechanism components; the arrangement of the prior art results in numerous parts and many connections between parts one unit and another. This has presented problems in terms of the cost and difficulty of assembly and adjustment work.

U.S. Pat. No. 4,152,060, entitled "Epicyclic Electromechanically Actuated Lens Drive" discloses a device in which the stator element and the movable element of an electromagnetic induction mechanism are functionally incorporated within a lens barrel; and a lens holder which carries a focusing lens group is arranged to be driven and controlled along the optical axis by virtue of electromagnetic induction. In this case, the lens holder is rotatably attached to the inside of a cylindrical armature while a stator is arranged coaxially with the optical axis of the lens. The armature and the lens holder are connected to each other by a mechanical coupling. A stepwise rotatory motion of a rotating device is converted into a stepwise focusing movement of the lens holder which takes place along the optical axis. The mechanical coupling is effected through the gear teeth of the lens holder and the armature. In the device according to U.S. Pat. No. 4,152,060, the driving force on the lens holder in the optical direction must be obtained by converting the rotary motion performed by the stator and the armature into the a linear motion resulting from the gear tooth coupling. This arrangement tends to have a loss in the efficiency of the driving force transmission. Besides, the use of an epicyclic motor also requires a high degree of precision in machine work on the parts involved in gear tooth coupling between the armature and the lens holder. It is a further shortcoming of this device that back-lash in the gear tooth coupling part causes some error in the movement of the lens holder and this problem also calls for a solution.

Further, in the field of zoom lenses which are arranged to vary the magnification of the picture image of an object to be photographed, lenses arranged to accomplish a position control over a variator lens group and a compensator lens by an electrical process are known, for example, U.S. Pat. No. 4,161,756 and 3,884,555, etc. The driving force for the lens holders of these variator and compensator lenses is arranged to be transmitted from a motor through a gear train mechanism. Therefore, the lens drive mechanism of these patents is clumsy or unshapely and has shortcomings with respect to the cost and assembly and adjustment work in the same way as in the case of the focusing lens arrangement mentioned in the foregoing.

SUMMARY OF THE INVENTION

It is a general object of the present invention to provide a lens barrel which eliminates the above stated shortcomings of the devices of the prior art. In other words, the objects include:

(1) Allowing a broader design latitude for the shape of the lens barrel to avoid a clumsy appearance. To attain this object, the use of the motor which has conventionally been used for the peripheral gear and the reduction mechanism of distance adjusting and zooming rings is rescinded and the same function is performed by a lens barrel which is arranged to perform the motor function.

(2) Having a plurality of driving actions for zooming, focusing, etc. performed within the same lens barrel. Unlike the conventional method, this is accomplished by arranging the lens barrel so it serves as a linear step motor while also performing the functions of a lens barrel. This arrangement lessens wasteful use of space because a motor which has no reduction mechanism can be directly connected to accomplish driving actions for zooming and focusing.

(3) To make the speed variable over a wide range, from a low to a high speed. Unlike the conventional method, a movable element is arranged to travel at a speed which may vary over a wide range, from a low to a high speed in proportion to the frequency of the pulse signal of a drive control circuit connected to a motor to attain the above stated objects (1), (2) and (3) of the invention. In addition, to the variable speed arrangement, the movable element can be kept in a stopped position by its own retentivity without having recourse to a brake.

(4) To permit the lens barrel to utilize a standardized mount for mounting and dismounting it to and from a camera without difficulty.

The above stated problems encountered by the conventional lens barrels are thus eliminated by replacing the conventional arrangement of a driving motor and a reduction mechanism within the camera system with the above stated linear motor which is also arranged to serve as a lens barrel in accordance with the invention.

It is a further object of the invention to provide a lens barrel construction wherein the stator element and the movable element of a stepping motor; which has been known in the field of motors, are functionally arranged as a fixed part and a moving part of the lens barrel and a focusing lens is arranged to be movable by an electromagnetic induction mechanism. Particularly, the lens barrel construction according to the invention obviates the necessity of any elicyclic gear coupling between an armature and a lens holder such as the one disclosed in the above stated U.S. Pat. No. 4,152,060.

These and further objects, features and advantages of the invention will become apparent from the following detailed description of preferred embodiments thereof taken in connection with the accompanying drawings.

BRIEF DESCRIPTION OF THE DRAWINGS

FIG. 6 is a cross sectional view taken in the axial direction of the embodiment; FIG. 7 is a partial cutaway view showing the essential parts of a stator element and a movable element arranged to electromagnetically drive a lens holding member shown in FIG. 6; and FIG. 8 is a sectional view taken along line A1-A2 of FIG. 6, showing the relation of teeth of a stator to those of a rotor and the arrangement of windings (in the case of five-phase excition).

DESCRIPTION OF THE PREFERRED EMBODIMENTS

Figure 1:
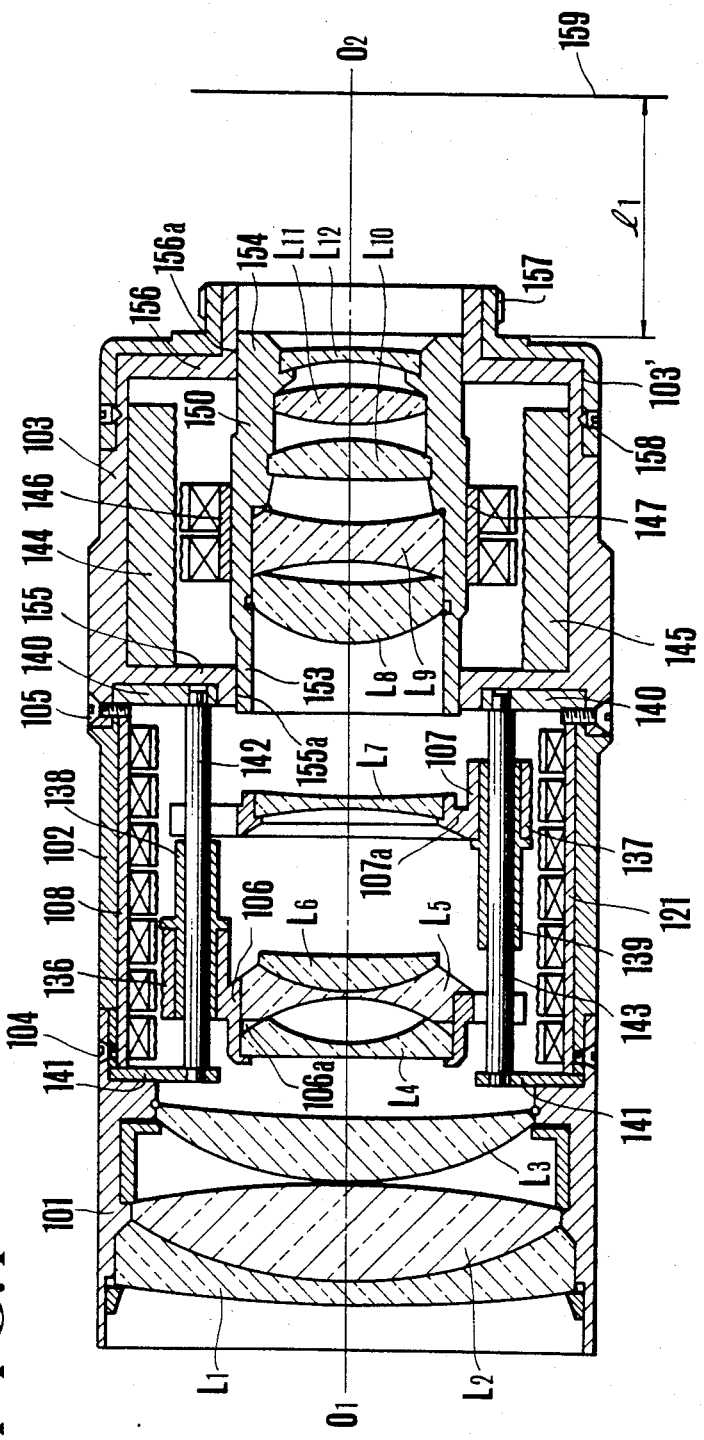
FIG. 1 is a cross sectional view showing a lens barrel as an embodiment of the present invention.

A first embodiment of the present invention is as shown in FIGS. 1 through 5. FIG. 1 is a sectional view of a zoom lens using a linear step motor arranged to serve as the lens barrel in accordance with the invention. The embodiment includes a front lens barrel 101; a middle lens barrel 102; and a rear lens barrel 103. The front lens barrel 101 and the middle lens barrel 102 are connected by a connection member 104 while the middle lens barrel 102 and the rear lens barrel 103 are connected by a connection member 105 to form one unified base cylinder. There are arranged, along the optical axis $0_1-0_2$, (within this base cylinder, and starting from the object side of the zoom lens), a front lens group consisting of lenses L1, L2 and L3; a variator lens group consisting of lenses L4, L5 and L6; a compensator lens group L7; and a focusing lens group consisting of lenses L8, L9, L10, L11 and L12. The front lens group L1, L2 and L3 are fixedly positioned within the lens barrel 101 and do not participate in the focusing operation. The variator lens group is positioned within a lens containing part 106a of a lens barrel 106. The compensator lens group L7 is positioned within a lens containing part 107a of lens barrel 107.

Two pairs of linear step motors which also serve as lens barrels in accordance with the present invention are composed of the lens barrel 102 forming the above stated base cylinder, the lens barrel 106 containing the variator lens group L4, L5 and L6 and the lens barrel 107 containing the compensator lens group L7.

A part of the lens barrel 102 is arranged to serve as the stator 108 of the upper linear step motor, as viewed on the drawing. This stator 108 comprises a permanent magnet 201 and ferromagnetic members 202 and 203 each having a plurality of divided teeth. Each of these ferromagnetic members is provided with a coil which is wound around it and is connected to a motor drive circuit. A movable element which will be described later is arranged to be moved by a magnetic field produced at the coil by the action of the motor drive circuit. Another part of the lens barrel 102 is also arranged to serve as the stator 121 of the lower linear step motor, as viewed on the drawing, in the same manner as the other part serving as the upper linear step motor. The stator 121 comprises a permanent magnet and ferromagnetic members each having a plurality of divided teeth. The ferromagnetic member has a coil wound around it while the coil is connected to the motor drive circuit. A magnetic field is arranged to be produced there to move a movable element by the action of the motor drive circuit. The lens barrel 106 has a ferromagnetic movable element 136 attached thereto in a position to confront the above stated stator 108. A metal piece 138 is also attached to the lens barrel 106. The lens barrel 107 likewise has a ferromagnetic movable element 137 attached thereto in a position to confront the stator 121 and has a metal piece 139 also attached thereto. Each of these movable elements is provided with a plurality of divided teeth. Guide shafts 142 and 143 which are arranged in parallel with the optical axis $0_1-0_2$ are interposed in between and secured to a part 140 which protrudes to a position not affecting an effective picture plane within the lens barrel 102 and a holding plate 141 which is attached to the lens barrel. The lens barrel 106 and 107 are arranged to be slidable and are guided on shafts 142 and 143. The metal piece 138, attached to the lens barrel 106, which contains the variator lens group L4, L5 and L6, is fitted on the guide shaft 142 and is arranged to be slidable thereon along the optical axis $0_1-0_2$. These parts constitute a first movable ring. The other metal piece 138, which is attached to the lens barrel 107 containing the compensator lens group L7, is likewise fitted on the other guide shaft 143 and is also arranged to be smoothly slidable thereon in the direction of the optical axis $O_1$-$O_2$. Those parts constitutes a second movable ring.

The first movable ring 106 and 138 and the second movable ring 107 and 139 are connected to the motor drive circuit and a motor control signal circuit through the coil of the stator (which is also arranged to serve as the lens; barrel 102) and; connection terminals which are not shown. The motor control signal circuit is designed to actuate the motor with a pulse signal produced therefrom. To adjust the zoom magnification to a desired value the linear step motor, according to the invention, is actuated to vary the magnification by moving the first movable ring. However, it is impossible to keep the air space distance between the lens L6 of the variator lens group and the compensator lens L7 unchanged at every value of magnification because the aberration and the in-focus point varies with the zooming magnification this prevents obtaining a sharp picture. To solve this problem, therefore, the air space distance is varied by moving the compensator lens L7 within the second movable ring. Since such distances are known at the time of designing the lens, the values of these distances are stored in the motor control circuit. When the zoom magnification is varied with the above stated movable which ring slides from the wide angle side to the telephoto side and vice versa, the focus is corrected by the automatic operation of the motor which moves the second movable ring in accordance with instructions from the motor control circuit. Meanwhile, a pair of linear step motors of this embodiment are formed by the lens barrel 103 which constitutes the base cylinder and a lens barrel 150 which contains the focusing lens group L8-L12. Stators 144 and 145, which are made of a ferromagnetic material and are respectively provided with a plurality of teeth protruding upward and downward, are attached to parts of the inside of the lens barrel 103 as shown in the drawing. Further, movable elements 146 and 147 are attached to the other circumference of the focusing lens barrel 150 and are arranged to confront, respectively, the stators 144 and 145. Each of the movable elements 146 and 147 comprises a permanent magnet and a ferromagnetic member having a plurality of divided teeth. A coil is wound around each of the ferromagnetic members and is connected to the motor drive circuit. With this coil arrangement, a magnetic field is produced by the action of the drive circuit to move each of the movable elements. Two ends 155 and 156 of the focusing lens barrel 150 are fitted on the two inner parts 153 and 154 of the lens barrel 103 at their fitting parts 155a and 156a. The lens barrel 150 which is formed into one body with the movable element is thus arranged to be smoothly movable. When a magnetic field is produced at the movable element by the switching actions of the motor drive and control circuit, the focusing lens barrel 150 is smoothly slides together with the lenses L8-L12, along the optical axis $O_1$-$O_2$ to perform a focusing operation. The camera is provided with a detection element which is not shown but is disposed on the imaging plane 159 or in a conjugate position equivalent to the imaging plane and is arranged to detect the degree of defocus on the imaging plane. With the detection element arranged to produce a signal, there also is provided a display device which is capable of taking out and amplifying the signal and is arranged to discern a near or a far focus and the extent of deviation of it from an in-focus point. The switches of the motor drive circuit and the motor control circuit are switched on or off and between advancing and retracting positions according to the display in order to accomplish the correct focusing operation. A pulse signal produced through the above stated motor drive and control circuits causes the movable element, which serves also as the focusing lens barrel, to slide forward or backward until it comes to an in-focus position.

The lens unit is coupled with a camera body by means of a mount screw 157. The lens coupling plane and the imaging plane 159 are spaced at a prescribed distance l1. The mount screw 157 is fitted on the peripheral part 103' of the lens barrel 103 and is secured thereto by means of fixing member 158. In cases where the index position of the lens unit must be changed relative to the camera body, the index position can be adjusted as desired by loosening the fixing member 158, and then freely turning the mount screw 157 and the lens unit relative to each other, and tightening the fixing member 158 to fix the mount screw 157.

The details of the operation of the movable element and the stator in the linear step motor, related to the first movable ring shown in FIG. 1, are as shown in FIG. 2. The following description covers the operation of them when the linear step motor is used as drive source. Referring to FIG. 2, permanent magnets 202 and 203 which are attached to base cylinder 102 are made of a ferromagnetic material and are composed of magnetic poles 1, 2, 3 and 4 and coils. The coils are provided with power supply closing parts 204 and 205 for the purpose of exciting them. Movable element 136 which is attached to lens barrel 106 consists of a plurality of teeth 206 and forms the first movable ring.

When the coils are excited one after another, the movable element moves in a manner as shown in FIGS. 2(a)-(d). Under the condition shown in FIG. 2(a), current is supplied to point 204 while point 205 remains unexcited. At coil 202, a magnetic flux from the permanent magnet enters teeth D and F through poles 3 and 4. Pole 3—tooth D and pole 4—tooth F are magnetically balanced.

Figure 2A:
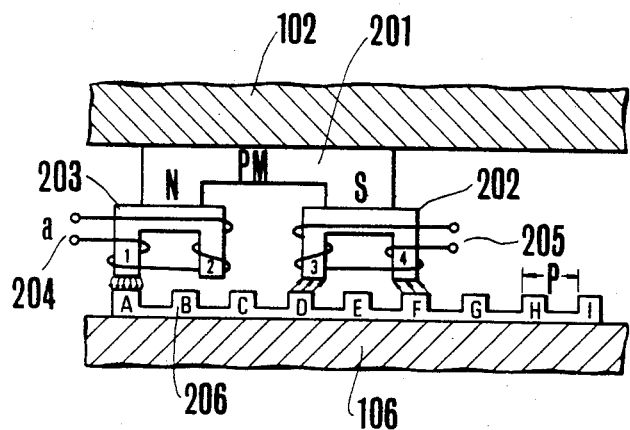
FIGS. 2(a), (b), (c) and (d) are detailed views showing the operation of a linear step motor which forms the first moving ring of the lens barrel shown in FIG. 1. These views show that a movable element moves accordingly as a stator element is gradually excited.
Figure 2B:
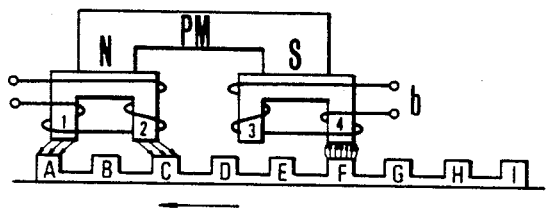

Meanwhile, at the other coil 1, the magnetic flux produced by the permanent magnet and another magnetic flux produced by a coil current are added up and concentrated at tooth A. On the other hand, at coil 2, the magnetic flux produced by the permanent magnet and the magnetic flux produced by the coil current are offset by each other of the resultant flux becomes zero. Accordingly, the magnetic flux forms a closed loop through pole 1→tooth A→teeth D and F→and poles 3 and 4. Therefore, pole 1 and tooth A are balanced in the most magnetically stable position. Following this, coil 205 is excited and a sum of the magnetic flux produced by the permanent magnet and the coil current is concentrated at pole 4. At pole 3, the magnetic fluxes produced by the permanent magnet and the coil current are offset by each other resulting in zero magnetic flux there. Meanwhile, the magnetic flux produced by the permanent magnet is concentrated at teeth A and C sine poles 1 and 2 are not excited. As a result, the magnetic flux forms a closed loop of pole 4→and tooth F→teeth A and C→poles 1 and 2. Accordingly the magnetic flux density is concentrated between the pole 4 and tooth F. This causes the movable element to move to the left as much as ¼ pitch of the tooth arrangement as shown in FIG. 2(b).

Figure 2C:
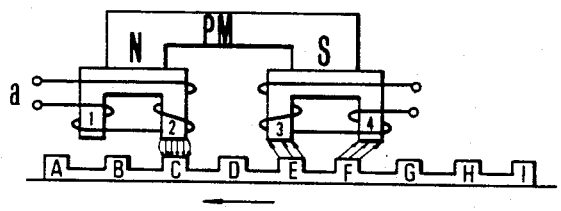
Figure 2D:
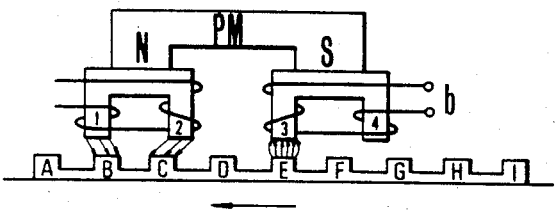

Next, coil 204 is excited as shown in FIG. 2(c) the sum of magnetic flux produced by the permanent magnet and the magnetic flux produced by the coil current concentrate at pole 2. At pole 1 the magnetic fluxes produced by the permanent magnet and the coil current mutually negate each other leaving no magnetic flux there. Since poles 3 and 4 are not excited, the magnetic flux produced from the permanent magnet is distributed through poles 3 and 4. Accordingly, the magnetic flux concentrates at pole 2 and tooth C to cause the movable element again to move to the left, as indicated by an arrow, as much as ¼ pitch. FIG. 2(d) shows the condition which results when coil 205 is excited under the condition shown in FIG. 2(c). In this case, the magnetic flux concentrates in pole 3 as previously mentioned. The movable element then again moves as much as ¼ pitch in the direction of arrow as shown in FIG. 2(d). The movable element thus moves to the left to the extent of one pitch when the coils are excited one after another as shown in FIGS. 2(a) through 2(d). While FIGS. 2(a)-(d) show the leftward movement of the movable element, the movable element can be moved to the right by excitation sequence to a sequence of steps different than those in FIGS. 2(a)→(d)→(c)→(b). Thus, the direction of the movable elements motion can be determined by shifting the sequence of the exciting steps.

The operation of the movable element and the stator of the linear step motor related to the second movable ring shown in FIG. 1 is as shown in detail in FIG. 3. The linear step motor includes a permanent magnet 301 attached to base cylinder 102 and ferromagnetic members 302 and 303 which consist of poles 1, 2, 3 and 4, and coils forming magnet parts. There are provided power supply closing parts 304 and 305. Movable element 137, which is attached to lens barrel 107 and is made of a ferromagnetic material, consists of a plurality of teeth 306. These parts constitute the second movable ring.

Figure 3A:
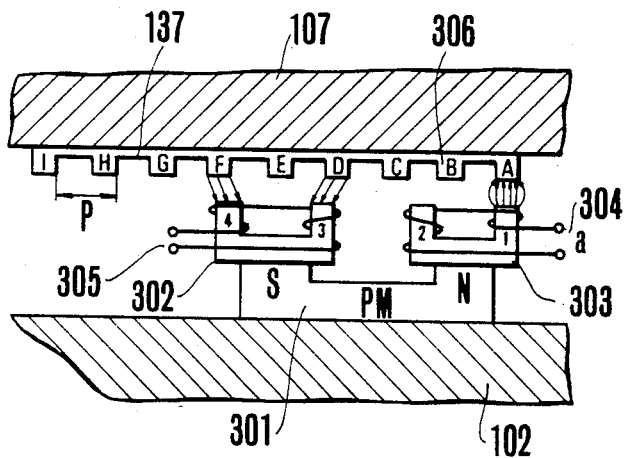
FIGS. 3(a), (b), (c) and (d) and detailed views showing the operation of a linear step motor forming a second moving ring of the lens barrel shown in FIG. 1.
Figure 3B:
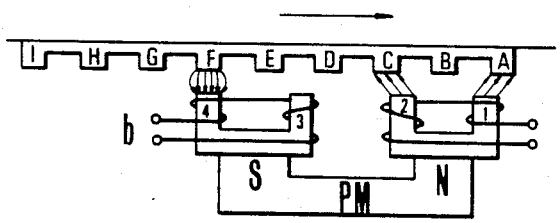

The movable element is moved by exciting the coils one after another in the manner shown in FIGS. 3(a) through 3(d). Under the condition shown in FIG. 3(a), coil 304 is excited. In the meantime, coil 305 remains unexcited. At magnet part 302, a magnetic flux produced by the permanent magnet enters teeth D and F through poles 3 and 4. Pole 3—tooth D and pole 4—tooth F are magnetically balanced. Meanwhile, at pole 1, a magnetic flux produced by the permanent magnet and another magnetic flux produced by a coil current are added up and the sum of the magnetic fluxes concentrates at tooth A. At another pole 2, the magnetic flux produced by the permanent magnet and the magnetic flux produced by the coil current negate each other leaving no magnetic flux there. Accordingly, a closed loop of magnetic flux is formed through pole 1→tooth A→teeth D and F→poles 3 and 4. Pole 1 and tooth A are thus balancing in magnetically stable positions. Following that, coil 305 is excited, as shown in FIG. 3(b), and the magnetic fluxes produced by the permanent magnet and the coil current are summed up and applied to pole 4. Meanwhile, the magnetic fluxes produced by the permanent magnet and the coil current are oppositely applied to pole 3. As a result, no magnetic flux remains at pole 3. On the other hand, since poles 1 and 2 are unexcited, the magnetic flux produced by the permanent magnet concentrates the teeth A and C. A closed loop of magnetic flux is formed through pole 4→tooth F→teeth A and C→poles 1 and 2. As a result, the magnetic flux density is concentrated between pole 4 and tooth F thereby moving the movable element as much as ¼ pitch of the tooth arrangement in the direction of arrow.

Figure 3C:
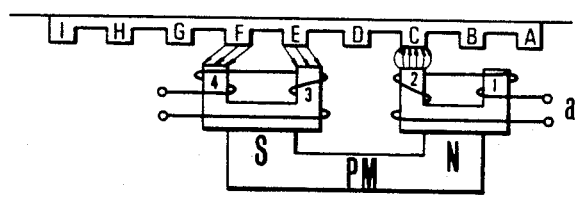
Figure 3D:
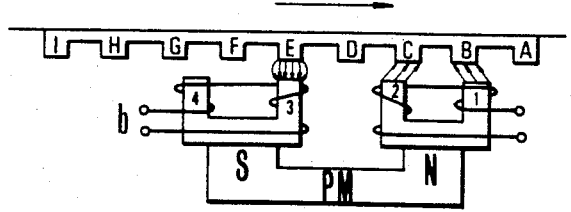

When current is passed through coil 304 as shown in FIG. 3(c), the sum of the magnetic flux produced by the permanent magnet and the magnetic flux produced by the coil current concentrates at pole 2. At pole 1, the magnetic fluxes produced by the permanent magnet and the coil current negate each other leaving no magnetic flux there. Since poles 3 and 4 are not excited, the magnetic flux from the permanent magnet is distributed through poles 3 and 4. Thus, the magnetic flux concentrates at pole 2 and tooth C. As a result, the movable element again moves as much as ¼ pitch to the right as indicated by an arrow. Under this condition, when coil 305 is excited, there exists a condition as shown in FIG. 3(d). Under the condition shown in FIG. 3(d), the magnetic flux concentrates at pole 3 again causing the movable element to move to the extent of ¼ pitch in the direction of the arrow. With the coils excited one after another in the sequence of steps, as shown in FIGS. 3(a)-(d), the movable element moves to the right to a total extent of one pitch.

While the rightward movement of the movable element takes place as shown in FIGS. 3(a)-(d), the movable element can be moved to the left by changing the sequence of steps of FIG. 3 to another sequence FIGS. 3(a)→(d)→(c)→(b). Therefore, the moving direction of the movable element is determined by the sequence of excitation of the coils.

The details of the operation of the movable element and stator of the linear step motor relative to the focusing lens barrel which is shown in FIG. 1 are as shown in FIG. 4. Referring to FIGS. 4(a)-(d) to this linear step motor includes a permanent magnet 401 which is attached to the focusing lens barrel 150; and magnet parts 402 and 403 which are made of a ferromagnetic material and consists of poles 1, 2, 3 and 4 and coils. These coils are arranged to be excited through power supply closing parts 404 and 405. Unlike the preceding cases of FIGS. 2 and 3, these parts 404 and 405 are arranged to serve as movable element. A ferromagnetic member 406 which is attached to base cylinder 103 consists of a plurality of teeth.

Figure 4A:
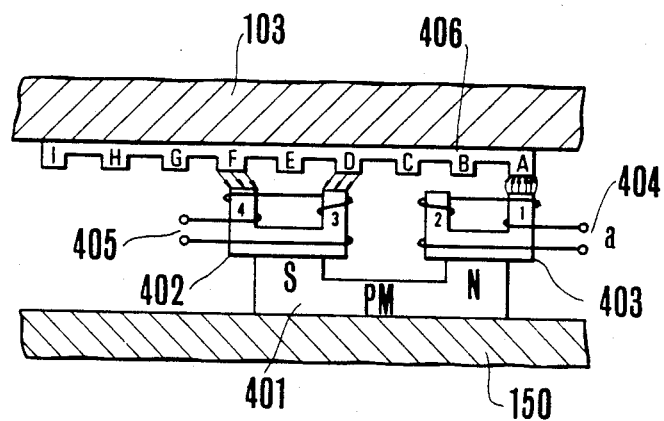
FIGS. 4(a), (b), (c) and (d) are detailed views showing the operation of a linear step motor forming a third moving ring of the lens barrel shown in FIG. 1. In these drawings FIGS. 3 and 4, the movement of a movable element is illustrated by steps in the same manner as in FIG. 2.
Figure 4B:
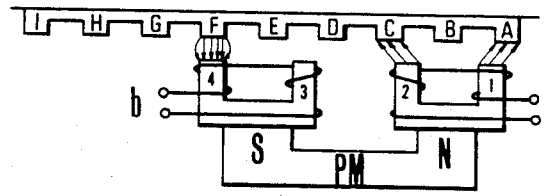

The steps of exciting these coils to move the movable element will be understood from the following description with reference to FIGS. 4(a) through (d). Under the condition shown in FIG. 4(a), excitation is effected through part 404 while part 405 remains unexcited. At magnet part 402, the magnetic flux from the permanent magnet enters teeth D and F through poles 3 and 4. Pole 3—tooth D and pole 4—and tooth F are magnetically balanced. In the meantime, magnetic fluxes produced by the permanent magnet and a coil current are summed up and the sum of magnetic fluxes concentrates at the tooth A. At pole 2, the magnetic fluxes produced by the permanent magnet and the coil current negate each other leaving no magnetic flux there. Accordingly, the magnetic flux forms a closed loop through pole 1→tooth A→teeth D and F→and poles 3 and 4. Accordingly, pole 1 and tooth A are balanced in magnetically stable positions. Following that, when part 405 is excited as shown in FIG. 4(b), the sum of the magnetic fluxes produced by the permanent magnet and the coil current is applied to and is concentrated at pole 4. Meanwhile, the magnetic fluxes produced by the permanent magnet and the coil current negate eac other leaving no magnetic flux there. At the poles 1 and 2 the magnetic flux produced by the permanent magnet concentrates at teeth A and C and the magnetic flux forms a closed loop through the pole 4—tooth F—teeth A and C—and poles 1 and 2, because poles 1 and 2 are not excited. As a result, the movable element moves to the left as shown by an arrow to an extent as much as ¼ pitch of the tooth arrangement as shown in FIG. 4(b).

Figure 4C:
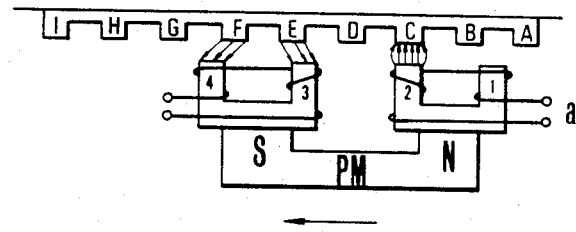
Figure 4D:
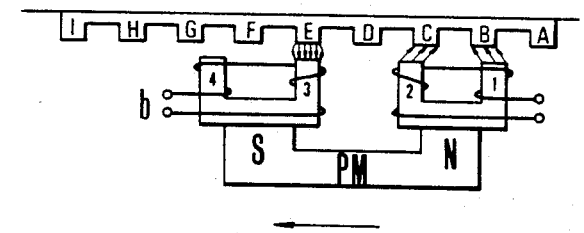

Next, excitation is effected through part 404 as shown in FIG. 4(c). The magnetic flux produced by the permanent magnet and the magnetic flux produced by the coil current are summed up and the sum concentrates at pole 2 while the magnetic fluxes produced by the permanent magnet and the coil current mutually negate leaving no magnetic flux at pole 1. Since poles 3 and 4 are not excited, the magnetic flux from the permanent magnet is distributed through these poles. Accordingly, the magnetic flux concentrates at pole 2 and tooth C causing the movable element to move again to the left as indicated by an arrow as much as ¼ pitch. After that, when excitation is effected through the part 405 as shown in FIG. 4(d), the magnetic flux concentrates at pole 3 in the same manner as mentioned above. Accordingly, the movable element is caused to move again to the left in the direction of arrow as much as ¼ pitch. Therefore, the movable element is caused to move to the left to an extent of one pitch by the above stated stepwise excitation as shown in FIGS. 4(a) through 4(d). The movable element can be moved in the reverse direction, that is, to the right, by effecting the stepwise excitation in a sequence of steps corresponding to FIGS. 4(a)→(d)→(c)→(b).

Figure 5:
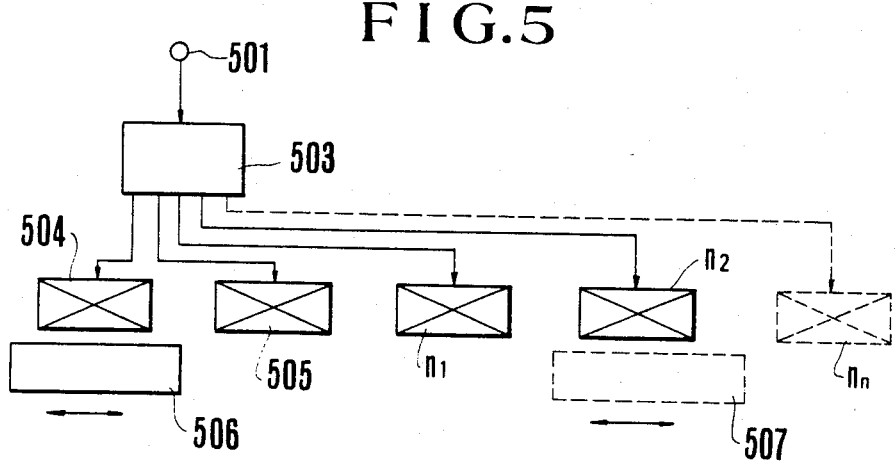
FIG. 5 is a circuit diagram showing means for minimizing current consumption where the movable element of the lens barrel is arranged to a large amount.

The arrangements shown in FIGS. 2, 3 and 4 are applicable to a lens barrel wherein the movable elements are not required to be moved to a great extent. However, in cases where the movable elements must be moved to a greater extent or stroke, the embodiment must be arranged as shown in FIG. 5. In this case, a plurality of coil units 504, 505, $n_1 \ldots n_n$ which correspond to parts 202 and 203 shown in FIG. 2 (consisting of a permanent magnet, ferromagnetic members and exciting coils) are arranged in a row. A movable element 506 is arranged to be moved in close contact with these coil units. This arrangement gives a relatively long stroke. Since, however, it is not desirable, in terms of efficiency, to always allow a current to flow simultaneously to all the coil units 504, 505, $n_1, n_2, \text{-} \text{-} \text{-} n\text{—}n_n$, the current is allowed to flow only to the coil that is confronting the movable element; in the particular example shown in FIG. 5, coil 504. More specifically, there is provided a change-over device 503, which shifts the current supply from one coil unit to another. This is necessary as one example of a power saving excitation method. In FIG. 5 reference numeral 501 indicates an input terminal for a coil current control signal. Timing of the current supply change-over by the change-over device 503, can be accomplished by employing command pulses which permit computation of extent of the movement (for an open loop) in effecting current supply change-over between the coil units 504, 505, $n_1, n_2, \text{-} \text{-} \text{-} n_n$, because the motor is a step motor.

It is also possible to move a movable element 507 (indicated by a broken line) and another movable element 506 independently of each other by dividing the coil units 504, 505, $n_1, n_2, \text{-} \text{-} \text{-} , n_n$ into two groups and by carrying out phase excitation control over each group independently. Further, since the method of dividing the coil units 504, 505, $n_1, n_2, \text{-} \text{-} \text{-} , n_n$ into a plurality of groups to carry out phase excitation control over one group independently, permits one of the same number of corresponding movable elements to be moved independently of another movable element, a plurality of movable elements can be arranged into one package using one common stator. Such an arrangement permits construction of a compact linear pulse motor.

The zoom lens which is arranged in the manner as described in the foregoing is mounted on a camera and is directed to an object to be photographed. Then, trimming is carried out at a desired magnification to effect focusing on an imaging plane with a high degree of resolution after aiming at an image of the object located at a certain distance within a photographing visual field. The operation of the zoom lens which is arranged as described in the foregoing is as follows: The zoom lens unit is first mounted on the camera. The zoom lens is directed to an object to be photographed. Next, to bring the image of the object to a desired size, the switch of a zooming button connected to a motor drive circuit is operated. With the switch closed, the coils connected to the motor drive circuit and the control circuit are excited in the sequence shown in FIG. 2 causing the first movable ring together with the variator lenses L4-L6 to slide along the guide shaft 142 in the direction of the optical axis $O_1$-$O_2$, so that the size of the image of the object can be varied to a desired size. At this time, the second movable ring also moves following the movement of the first movable ring. This is because the desired distance between the first and second movable rings is stored in the control circuit. The coils connected to the motor drive circuit and the control circuit cause the second movable ring and the compensator lens to move in the sequence of FIG. 3, in accordance with the command from the control circuit, as shown in FIG. 3, in the direction of the optical axis $O_1$-$O_2$ while being guided by guide shaft 143. The sliding movement of the second movable ring completely eliminates any adverse effect of the zooming action on the focused state of the image on imaging plane 159. Following this, when the image of the object is adjusted to a distance measurement mark provided within a view finder, a defocused degree detecting device indicates whether the image is near focused or far focused. Next, when a button switch connected to the focusing motor drive circuit is operated, the coils connected to the motor drive circuit and the control circuit cause lens barrel 150 and focusing lenses L8-L12 to move along the optical axis $O_1$-$O_2$ in the sequence shown in FIG. 4. Then, the display value of the defocused degree detecting device varies according to movement of lens barrel 150. The driving action of the motor is brought to a stop when the defocused state becomes an in-focus state. The motor driving action can be controlled either automatically or manually. Therefore, an automatic focusing operation can be accomplished by automatically detecting the defocused degree and by automatically turning the motor on and off through the control circuit. It goes without saying that, in accordance with the invention, zooming can be accomplished either before or after focusing.

In the embodiment described above, the coil is wound on the movable element on the side of the focusing lenses. The same effect is obtainable however, by winding the coil on the stator instead of the movable element in the same manner as in the case of the first movable ring. In the case of FIG. 1, showing the arrangement of the invention by way of example, the stator for driving the variator lens group is disposed on the upper side while the stator for driving the compensator lens is disposed on the lower side and the arrangement thus consists of two seriated stators. However, the same effect can be obtained by using a single stator as shown in FIG. 5 with an intermediate tap arranged to permit driving two movable elements. The movable element which serves as a movable ring may be formed into one unified body with the lens barrel. Such arrangement not only gives the same effect but greatly contributes to a reduction in cost.

While the linear step motor is employed in the embodiment described above, this may be replaced with a linear servo-motor to obtaining the same effect.

As will be understood from the description of an embodiment given above, the advantages of the lens barrel according to the invention include:

(1) The provision of the linear step motor which also serves as a lens barrel facilitates attaching and detaching the lens to and from a camera. This facilitates mounting arrangements of the lens barrel as an interchangeable lens.

(2) Compared with the conventional arrangement of the external motor type, the invented arrangement dispenses with a reduction mechanism and this results in a reduction in the number of assembly processes.

(3) Improvement in appearance because of compactness.

(4) With interlocking gears replaced by a direct connection arrangement, there is no play and forward and backward movements can be accomplished with a high degree of precision and improved responsivity.

(5) Driving can be accomplished at a high or low speed in proportion to the frequency of the pulse signal. This permits speed variation over a wide range.

(6) The use of a permanent magnet force gives a self retaining force, which ensures that a desired position can be retained without the use of a brake.

(7) The lens barrel and the ferromagnetic member can be formed into one unified shape. This permits a reduction in the number of parts.

(8) The stator element and the movable element of the linear step motor type electromagnetic mechanism can be placed within a space between the base cylinder and the movable lens barrel of the lens barrel assembly. Therefore, the electromagnetic mechanism does not cause any particular increase in the outside dimensions of the lens barrel assembly. Besides, unlike the conventional lens barrel of the type incorporating an electric motor which results in some protrudent part on the outside of the lens barrel, the lens barrel according to the invention permits a photographing operation without losing weight balance in the longitudinal direction or the direction of the optical axis of the lens barrel.

Further, in the embodiment shown in FIGS. 1 through 5, the linear step motor is arranged to move two lens barrels 106 and 139 for zoom lenses and is provided with permanent magnets 201–201n as a stator of fixed lens barrel 102 with magnet parts 202 and 203 provided at the fore ends of the magnetic poles of each permanent magnet. Meanwhile, sliding members 138 and 139 are provided with a plurality of pole teeth 206 (or teeth A–I, - - - ) and are arranged in sequence along the optical axis as the movable element. However, the arrangement of the stator and that of the movable element may be interchanged.

Figure 6:
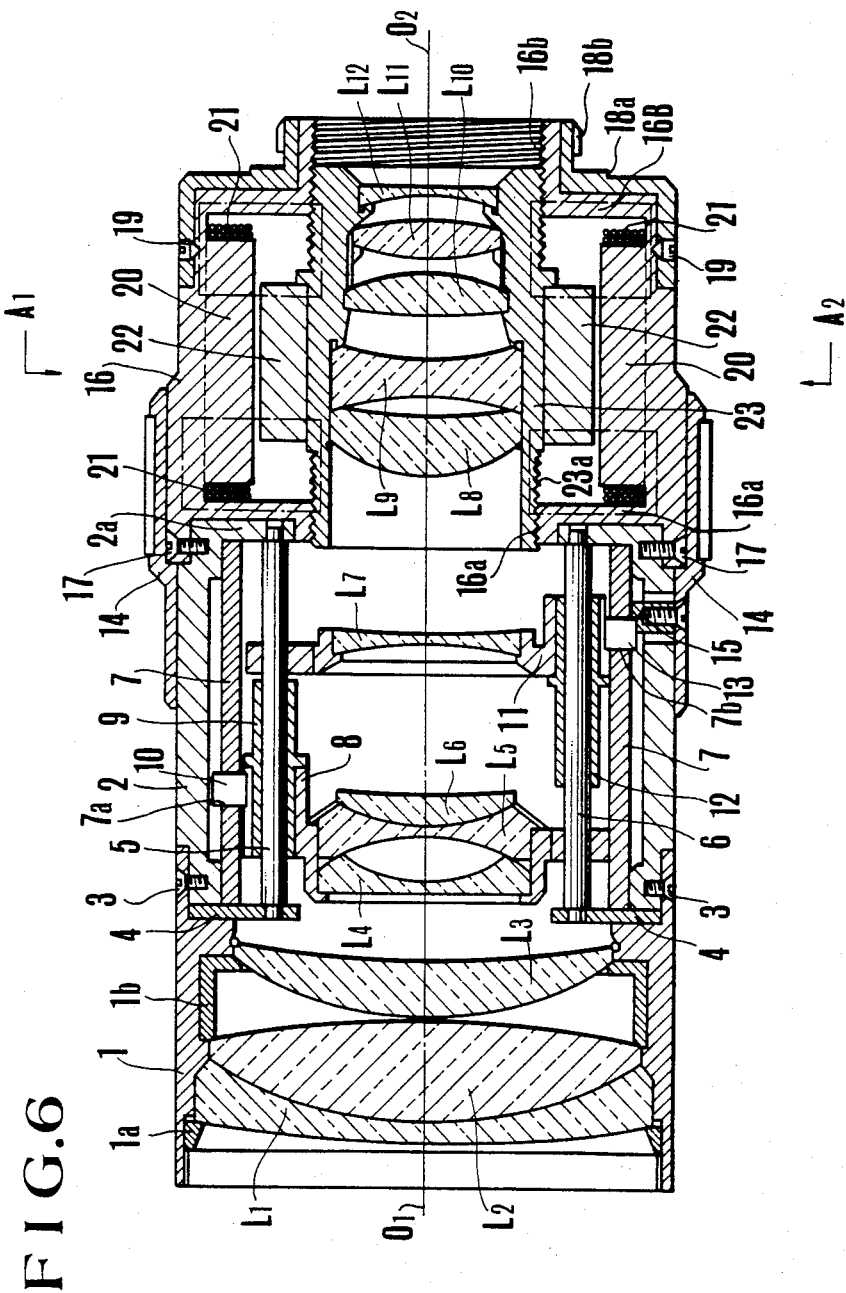
Figure 7:
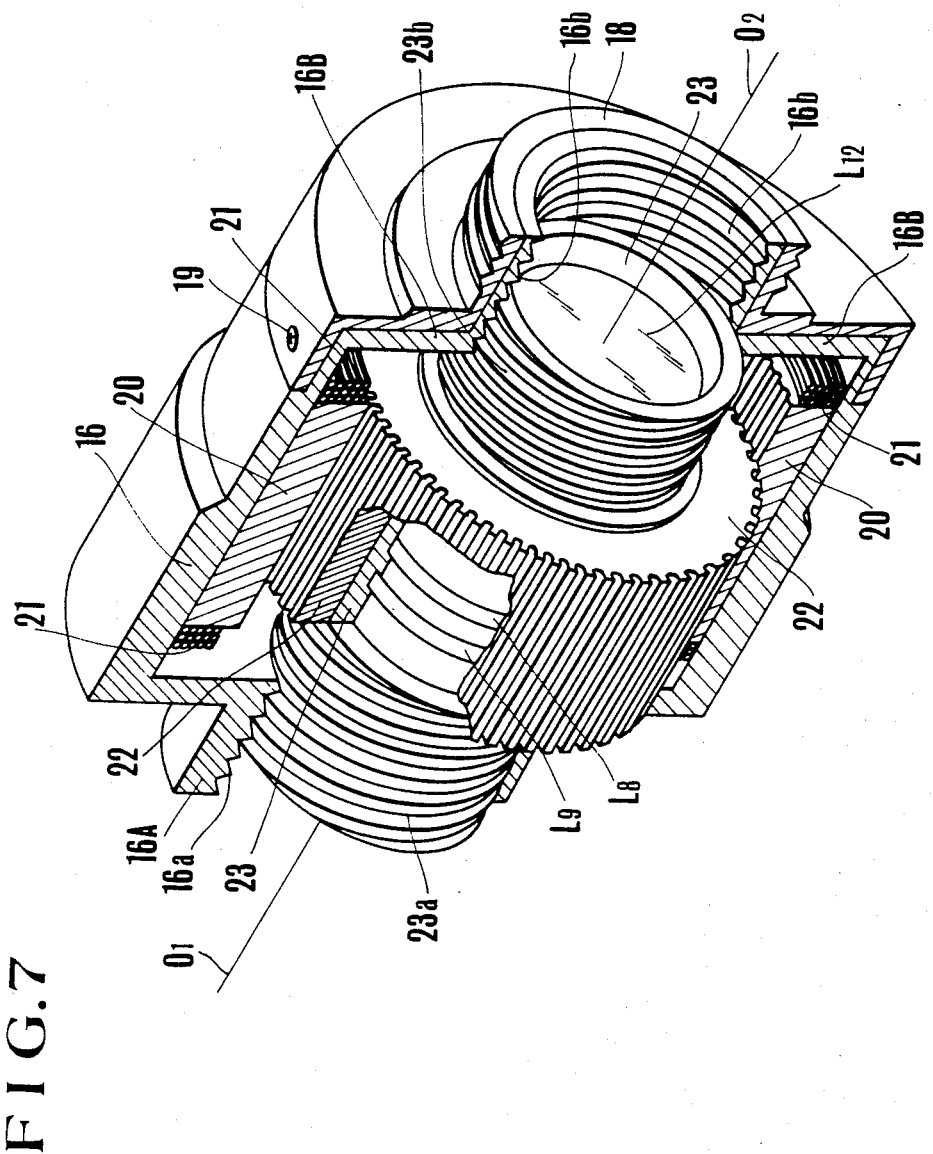

A second embodiment of the invention is as shown in FIGS. 6 and 7, the former showing the lens barrel in a longitudinal sectional view and the latter in a partially cutaway view respectively. The lens barrel of this embodiment includes a lens optical system consisting of four lens groups and a zooming mechanism.

Referring to FIGS. 6 and 7, the first lens group consists of lenses L1, L2 and L3. The second lens group, which is adapted for varying the magnification of an image, consists of lenses L4, L5 and L6. The third lens group, which is adapted for correcting image distortion resulting from the variating action of the second lens group on the magnification, consists of a lens L7. The fourth lens group, which is adapted for performing a focusing action, consists of lenses L8, L9, L10, L11 and L12. In the preceding embodiment, shown in FIG. 1, the lens optical system comprises a relay lens group consisting of lenses L1, L2 and L3, variator lens group L4–L6 and compensator lens group L7. The present invention, however, is also applicable to an optical system which is known by the name of a single lens (a standard lens) consisting solely of focusing lenses. The first lens group, L1–L3 is carried by lens barrel 1, which is arranged to hold each lens in place, inside thereof, through lens holding members 1a and 1b. A second lens barrel 2 is connected to the first lens barrel by means of screws 3.

A zoom mechanism is disposed within the second lens barrel. The rear end of the second lens barrel is formed into a flange, part 2a, which protrudes inward. At the fore end of the second lens barrel, a retainer plate 4 is fixedly interposed in between the first and second lens barrels, 1 and 2. Guide members 5 and 6 which are in a bar-like shape are disposed to span the space between retainer plate 4 and the above stated flange part 2a and are secured to them. On the inner circumference of the second lens barrel 2, there is fitted in a cylindrical cam member 7 which is arranged to be rotatable by a rotatory operation of a zoom operation ring 14 which will be described later. The cylindrical cam member is provided with cam slots 7a and 7b for controlling the movement of variator lens group L4–L6 and compensator lens group L7. Variator lens group L4–L6 is carried by a lens holding member 8. Lens holding member 8 is connected to a movable member 9 which is fitted on the above stated guide member 5.

The above stated movable member 9 has a guide pin 10 secured thereto. Guide pin 10 is fitted into the cam slot 7a which is provided in cam member 7 for controlling the variation of the magnification of the image.

Compensator lens L7 is carried by a lens holding member 11 which is connected to a movable member 12 fitted on the above stated guide member 6. This movable member 12 has a guide pin 13 secured thereto. Guide pin 13 is fitted in cam slot 7b provided in cam member 7 for controlling the correcting action of compensator lens L7. The above stated zoom operation ring 14 is fitted on the outer periphery of second lens barrel 2 and is connected to cam member 7 through a connecting means 15.

In the technical field of lens barrels, of the type arranged to be capable of performing a zooming action, many kinds of means corresponding to connecting means 15 have been proposed. Therefore, one of such known means of prior art may be employed as the connecting means 15. For example, the connecting means may be arranged as follows: zoom operation ring 14 and cam member 7 are connected with each other by a connecting member which pierces through a hole provided in the circumference of second lens barrel 2. With the zoom lens arranged in this manner a rotation of zoom operation ring 14 is round the optical axis $O_1-O_2$ causes cam member 7 to rotate together with ring 14. With cam member 7 caused to rotate in this manner, the second and third lens groups respectively move in parallel with the optical axis to perform a magnification varying action and a distortion correcting action according to the degree of displacement of the curves of the cam slots formed in the cam member.

A third lens barrel 16 contains an electromagnetic induction mechanism arranged to control the extent of the forward movement of the fourth lens group consisting of focusing lenses L8-L12. Since the third lens barrel is arranged to form a part of the magnetic circuit which will be described herein, the third lens barrel is made of a magnetic material and is connected to the second lens barrel with screws 17.

A bayonet or screw mount member which is provided for mounting the lens barrel assembly on the camera body is attached to a mount member 18. The Mount member 18 is secured to the rear end of the third lens barrel 16 with screws 19.

Figure 8:
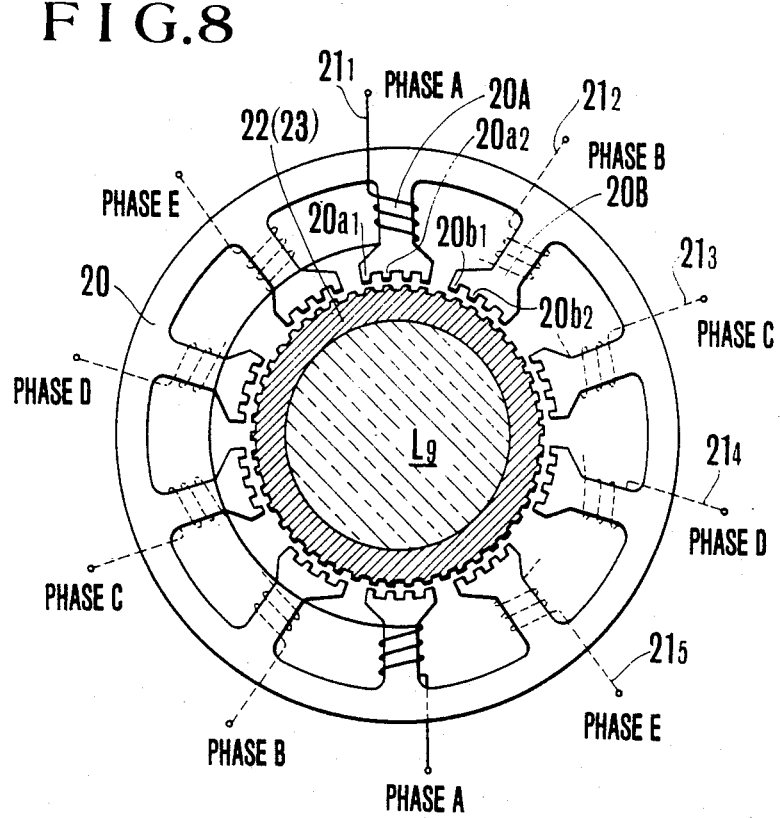
FIGS. 6, 7 and 8 illustrate a second embodiment of the invention. Of these drawings.

A cylindrical member 20 is secured to the inner circumferential face of the third lens barrel 16. This cylinder is made of a magnetic material and is arranged to form a stator part. As shown in FIG. 8, cylinder member 20 is provided with arm parts 20A, 20B, - - - which extend from the inner circumferential face of cylinder member 20. The fore end of each of the arm parts is formed into teeth $20a_1$, $20a_2$, - - - or $20b_1$, $20b_2$, - - -, and so on. These teeth are arranged to form a concentric circle. The arm parts of stator part 20 or the cylinder member are provided with exciting coils $21_1$-$21_5$ which are wound around them for the purpose of exciting the teeth Reference numeral 22 indicates a hollow cylindrical member. Hollow cylindrical member 22 is arranged to serve as the rotation shaft of the motor and is made of a magnetic material, such as ferrite or some other suitable oxide magnetic material. On the outer circumference of this hollow cylindrical member 22 and around the optical axis thereof, alternately arranged A and N poles are provided. A lens holding member 23, which is arranged to hold the fourth lens group for focusing, is secured to the inner circumferential face of hollow cylindrical member 22 by means of an adhesive or the like. The outer peripheral portions of lens holding member 23 at the fore and rear ends thereof are formed into helicoidal screw parts 23a and 23b. The threads of these helicoidal screw parts 23a and 23b are engaged with the helicoidal screw parts 16a and 16b which are formed on the flange parts (or protudent parts) formed at two ends of the third lens barrel 16 to extend in the radial direction relative to the optical axis.

Coils 21 mentioned in the foregoing, are arranged to receive power from a power source which is not shown. For this purpose, an electrical connector may be provided on the mounting surface 18a, of the mount member 18, of the above stated mount means of the lens barrel assembly. A connector thus arranged may be connected to coils 21 thereby permitting power suppied from a drive circuit, disposed on the side of the camera body, when the lens barrel assembly is mounted on the camera body. Another way of supplying power to coils 21 is to use a battery which may be arranged on the side of the lens barrel assembly to effect the power supply through electrical connections. When power is supplied the terminal of the above stated coil arrangement 21, cylinder member 20 becomes an electromagnet thereby forming magnetic circuits at third lens barrel 16, cylinder member 20, permanent magnet cylinder member 22, lens holding member 23 and flange parts 16A and 16B formed at the fore and rear ends of the third lens barrel 16. This creates a rotational force to rotate, on the optical axis, a rotor consisting of permanent magnet cylinder member 22 and lens holding member 23. This rotating force causes focusing lenses L6-L12 to move parallel to the optical axis through the screwed engagement of lens holding member 23 and flange parts 16A and 16B of the third lens barrel 16. Forward of backward movement of the focusing lenses can be determined by selecting the direction of rotation of the rotor. This is accomplished by selecting the direction in which the power supply is connected to the driving circuit, which is not shown to the above stated coil arrangement 21. Therefore, the direction of the focusing lenses motion is controllable by such selection.

In the rotor shown in FIG. 6 (consisting of hollow cylindrical member 22 and lens holding member 23), the space between the rotor and the stator (or cylinder member 20) must be arranged to be as small as possible in order to ensure smooth movement of the rotor. In one example of a methods for attaining this purpose, lens retainer member 23 and flange parts 16A and 16B are provided with bearing means. As this embodiment is described above, the stator of the motor is arranged to be a fixed lens barrel and the rotor thereof to be a hollow cylinder member. Optical elements such as lenses are disposed within the hollow cylinder member. The optical elements are arranged to make controlled movement along the optical axis of said elements. Then, a signal of an image formed by the focusing optical system is supplied, for example, to a focus detecting device (including defocused degree detection means) which is arranged to detect whether the focusing optical system should be moved forward or backward. The focusing optical system then can be moved as required for bringing it into an in-focus position through a coil power supply circuit which is not shown.

In the embodiment described above, the coil is disposed on the side of the stator and the permanent magnet on the side of the rotor. The coil however may be disposed on the rotor side. Further, the arrangement may be replaced with the a coreless motor. It is also possible to have cylinder member 22 the rotor formed into one unified body with lens holding member 23 by during the molding process. Cylinder member 22 does not have to be of a closed cylindrical shape but may be replaced with an arcuate permanent magnet attached to the outer circumferential surface of the lens holding member. In the embodiment, focusing optical elements L8-L12 are all arranged to be movable, however in accordance with the invention, this focusing optical system may be replaced with another optical system arranged to have a part thereof attached to a fixed lens barrel while the rest is arranged to be movable in the direction of the optical axis.

In accordance with the invention, some components of the lens barrel assembly can be utilized as a rotor and as a stator of a motor. This removes the need for arranging a driving motor and a gear mechanism, for distance adjustment, on the outside of the lens barrel, as in the case of the conventional arrangement, and yet, a phototaking lens that is completely electrically controllable can be obtained. Further, in accordance with the invention, the focusing optical system driving mechanism can be arranged into one stator part and one rotor part.

Therefore, it is possible to arrange the focusing optical system driving mechanism into one unit and to have the unit placed within third lens barrel 16. Then, in the processes of manufacture and production management, this unit can be processed separately from the zoom mechanism part shown in FIG. 1 for the purposes of assembly, quality control and production control.

In accordance with the invention, the fixed member of the lens barrel assembly can be used as the stator and lens holding member 23 as a part of the rotor. This permits arrangement to support the lens holding member 23 with parts (the flange parts 16A and 16B) of a fixed lens barrel for simplification of the construction of the lens barrel assembly.

What we claim:

1. A lens barrel operated by electromagnetic induction, comprising:
   (a) lens barrel means for attachment to the body of an apparatus;
   (b) first and second optical element holders arranged to hold an optical variator element which performs a focal length adjusting action and an optical compensator element, said holders being arranged to be slidable directly or indirectly relative to said lens barrel means and to keep an optical center unvaried during the sliding movement thereof; and
   (c) means for moving said first and second optical element holders along the optical axis of said optical elements with said holder kept in a non-rotating state,
   said moving means being electromagnetic induction means including a stator element and a movable element and being of the type capable of moving said movable element in a non-rotating state, said moving means being arranged to move each of said holders independently of the other in response to an electrical signal,
   said stator having a magnet part including exciting coils and a plurality of poles which are made of a ferromagnetic material and formed at two pole parts of a permanent magnet, which are arranged on the inner circumference of said lens barrel means along the optical axis, said magnet part being arranged in a row over the whole moving range of said optical variator and compensator elements,
   said movable element being formed from a ferromagnetic material on said first and second optical element holders and being provided with several pole teeth arranged in a row along the optical axis and spaced at a pitch differing from that of said poles of the stator, said movable element being arranged to cause the first and second optical element holders to be moved independently of each other by attraction which takes place between said poles of the stator and said pole teeth of the movable element when power supply is effected to said exciting coils.

2. A zoom lens mounting comprising:
   (a) lens barrel means for attachment to a camera body;
   (b) a zoom lens optical system having an image magnification changing function and an image shift compensating function for effecting zooming;
   (c) zoom lens drive means for controlling adjustment of each lens separation of said zoom lens optical system to effect zooming, said zoom lens drive means having a cam member rotatable by a force from outside of said mounting and transmitting means engaging in a cam groove formed in said cam member to transmit the lead of the cam groove to axial movement of said zoom lens optical system;
   (d) a focusing lens optical system positioned in the rear of said zoom lens optical system;
   (e) a lens holder containing said focus lens; and
   (f) electromagnetic drive means for controlling movement of said lens holder having:
      (i) a field member fixed to said lens holder;
      (ii) an armature member arranged in the inner diameter of said lens barrel means so as to cover the outer periphery of said field member; and
      (iii) rotational-to-axial transmitting means, said rotational-to-axis transmitting means having a male helicoid formed in the outer periphery of said lens holder, and a female helicoid fixed to said lens barrel means and meshing with said male helicoid,
   whereby said focusing lens optical system is held in axial alignment with said zoom lens optical system by the meshing engagement of said male helicoid and said female helicoid, and rotative motion of said male helicoid by the electromagnetic action of said armature member on said field member is transmitted to axial movement of said focusing lens optical system.

3. A zoom lens mounting comprising:
   (a) lens barrel means for attachment to a camera body;
   (b) a zoom optical system having a variator and a compensator movable for zooming;
   (c) lens holders containing said variator and said compensator respectively;
   (d) guide means fixedly secured to the inner surface of said lens barrel means in parallel with an optical axis of said zoom lens optical system and positioned through said lens holders to guide said lens holders along the optical axis; and
   (e) electromagnetic means for driving at least one of said variator and said compensator to move, comprising:
      (i) a stator consisting of a plurality of permanent magnet pieces oriented with their polarity to axial directions and positioned inside said lens barrel means in end-to-end relation, and a number of exciting coils, twice as many as the number of permanent magnet pieces turned on either pole of said permanent magnet pieces respectively;
      (ii) a movable element fixedly secured to said lens holder and arranged so as to confront said stator; and
      (iii) current supply control means connected to said exciting coils upon selective current supply to cause said stator and said movable element to drive motion of said lens holder axially as it is guided by said guide means.

4. An electromagnetic induction motor driven lens mounting comprising:
   (a) lens barrel means for attachment to the body of an instrument;
   (b) optical elements, including an optical element for focusing, an optical element for variation of the image magnification and an optical element for aberration compensation, the latter two cooperating with each other to adjust the focal length of the entire system, said three optical elements being fixedly carried by respective first, second and third optical element holders; and (c) moving means for moving said first, second and third optical element holders along a common optical axis of said optical elements while restraining said three holders from rotation about said optical axis, said moving means being a linear motor type electromagnetic induction means comprising a stator and a movable element and responsive to electrical signals for moving said optical element holders independently of another another, said stator and said movable element being positioned in a space between said lens barrel means and said optical element holders.

5. A lens mounting according to claim 4, wherein:

(a) said stator has a magnet part including exciting coils and a plurality of poles which are made of a ferromagnetic material and formed at two pole parts of a permanent magnet, said two pole parts of the permanent magnet being arranged on the inner circumference of said lens barrel means along the optical axis;

(b) said movable element includes a plurality of pole teeth which are made of a ferromagnetic material and are spaced on the outer circumference of said optical element holder at a pitch differing from that of the poles of said stator and is arranged to confront the poles of the stator; and (c) power supplied to said exciting coil causes said optical element holder to be moved in the direction of the optical axis by an attracting action which takes place between the magnet part of the stator and the pole teeth of said movable element.

6. A lens barrel according to claim 4, wherein said electromagnetic induction means comprises:

(a) said stator, which is provided with a plurality of pole teeth made of a ferromagnetic material, said teeth being arranged in a row on the inner circumference of said lens barrel means in the direction of the optical axis;

(b) said movable element, which includes a magnet part including a plurality of poles made of a ferromagnetic material and disposed at two pole parts of a permanent magnet arranged on the outer circumference of said optical element holder along the optical axis, said poles having exciting coils would around them, said magnet part being arranged to confront said pole teeth of the stator; and (c) arrangement to effect power supply to said exciting coils, said power supply being arranged to cause said optical element holder to be moved in the direction of the optical axis by an attracting action which takes place between the magnet part of the movable element and the pole teeth of the stator.

* * * * *